US009387818B2

(12) United States Patent
Sugimoto et al.

(10) Patent No.: US 9,387,818 B2
(45) Date of Patent: Jul. 12, 2016

(54) HARNESS EXTERIOR PROTECTOR (71) Applicant: Yazaki Corporation, Tokyo (JP)

(72) Inventors: Masahisa Sugimoto, Susono (JP);
Mitsuharu Nagahashi, Susono (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 14/501,581

(22) Filed: Sep. 30, 2014

(65) Prior Publication Data

US 2015/0014017 A1 Jan. 15, 2015

Related U.S. Application Data

(63) Continuation of application No. PCT/JP2013/002117, filed on Mar. 28, 2013.

(30) Foreign Application Priority Data

Mar. 30, 2012 (JP) .................................. 2012-079353

(51) Int. Cl.
*H02G 3/04* (2006.01)
*B60R 16/02* (2006.01)

(52) U.S. Cl.
CPC .......... *B60R 16/0215* (2013.01); *H02G 3/0406* (2013.01); *H02G 3/0468* (2013.01); *H02G 3/0475* (2013.01); *H02G 3/0487* (2013.01)

(58) Field of Classification Search
USPC .......................................... 174/152 G, 153 G
See application file for complete search history.

(56) References Cited

U.S. PATENT DOCUMENTS

| 5,300,734 | A | 4/1994 | Suzuki | |
|---|---|---|---|---|
| 6,051,789 | A | 4/2000 | Kato | |
| 6,875,918 | B2 * | 4/2005 | Sudo | H02G 3/06 138/108 |
| 7,829,789 | B2 * | 11/2010 | Yamaguchi | B60N 2/0224 174/68.1 |
| 7,868,256 | B2 * | 1/2011 | Suzuki | B60R 16/0222 16/2.1 |
| 7,980,518 | B2 * | 7/2011 | Katou | B60R 16/0215 174/525 |
| 8,201,778 | B2 * | 6/2012 | Yamamoto | F16L 3/015 174/525 |

FOREIGN PATENT DOCUMENTS

| CN | 1193836 A | 9/1998 |
|---|---|---|
| EP | 1923272 A1 | 5/2008 |
| JP | 10-096486 A | 4/1998 |
| JP | 2007060780 A | 3/2007 |

(Continued)

OTHER PUBLICATIONS

International Search Report and Written Opinion mailed Sep. 26, 2013, issued for PCT/JP2013/002117.

(Continued)

*Primary Examiner* — Dhirubhai R Patel
(74) *Attorney, Agent, or Firm* — Locke Lord LLP; James E. Armstrong, IV; Brian S. Matross (57) ABSTRACT

A harness exterior protector basically includes: a synthetic-resin-made flat bellows tube portion; and a flat straight tube portion integrally continued to the flat bellows tube portion. A round bellows tube portion may be provided instead of the flat bellows tube portion. A round straight tube portion may be provided instead of the flat straight tube portion. Preferably, an inner peripheral surface of the bellows tube portion and an inner peripheral surface of the straight tube portion are continued straight to each other without difference in level.

2 Claims, 5 Drawing Sheets

(56) References Cited

FOREIGN PATENT DOCUMENTS

| | | |
|---|---|---|
| JP | 2009-143326 A | 7/2009 |
| JP | 2010-012868 A | 1/2010 |
| JP | 2010-260241 A | 11/2010 |

OTHER PUBLICATIONS

Notification of Reasons for Refusal, issued in corresponding Japanese Patent Application No. JP 2012-079353, dated Sep. 28, 2015.
Office Action issued in corresponding Chinese Patent Application No. CN 201380028504.8, dated May 4, 2016.

* cited by examiner

HARNESS EXTERIOR PROTECTOR

TECHNICAL FIELD

The present invention relates to a harness exterior protector composed of any one or both of a bellows tube portion and a straight tube portion made of synthetic resin and used as, for example, an exterior member of an on-vehicle wiring harness.

BACKGROUND ART

Conventionally, various harness exterior protectors such as a synthetic-resin-made corrugated tube are proposed for protecting electric wires arranged in an inside of a vehicle from interference with a vehicle body or the like.

For example, in PTL 1, it is described that a harness exterior protector is composed of a circular-sectional-shaped bellows tube portion with a large diameter and a circular-sectional-shaped straight tube portion with a small diameter. For example, the straight tube portions are arranged in series in between two bellows tube portions and in one end of one bellows tube portion and in the other end of the other bellows tube portion. The bellows tube portion is bendable three dimensionally. The straight tube has higher rigidity than the bellows tube portion.

The bellows tube portion is arranged in a bending manner and the straight tube portion is arranged straight according to a harness arranging route in a vehicle. In an embodiment described in PTL 1, the harness exterior protector is arranged from a rear high voltage battery to a front inverter in a hybrid vehicle.

In PTL 1, as a method for producing the above harness exterior protector, it is described that liquid resin material is supplied to an inside of a molding machine via a die from an extruding machine. The molding machine includes an upper die mechanism and lower die mechanism allowing a bellows tube portion molding die and a straight tube portion molding die to rotate continuously in a loop shape. When the upper and lower die mechanisms are rotated reversely and synchronously, the harness exterior protector is continuously extruded.

Further, in PTL 2, it is described that as a wiring harness routed from a rear battery via an underfloor to a front inverter in a hybrid vehicle, an oval-sectional-shaped flat corrugated tube (harness exterior protector) is arranged in an underfloor. A circular-sectional-shaped round corrugate tube (harness exterior protector) is routed from the underfloor flat corrugate tube via a hard-resin-made protector to the battery and the inverter. A plurality of high voltage electric wires and low voltage electric wires are arranged parallel to each other in the flat corrugate tube.

CITATION LIST

Patent Literature

[PTL 1]
JP, A, 2009-143326
[PTL 2]
JP, A, 2010-12868

SUMMARY OF INVENTION

Technical Problem

However, according to the conventional harness exterior protector described in PTL 1, when an oval-sectional-shaped electric wire is inserted into an inside of the circular-sectional-shaped harness exterior protector, large gaps are generated in, for example, upper and lower positions between an inner surface of the harness exterior protector and an outer surface of the electric wire at a shorter diameter side, thereby there is a fear that a spatial waste and a rattle may be generated. Further, because the straight tube portion and the bellows tube portion are formed in a circular sectional shape, when the harness exterior protector is routed in a narrow space (routing path) such as a floor of a vehicle, there is a fear that the straight tube portion or the bellows tube portion may interfere with a vehicle body or the like, and the harness exterior protector may not be routed smoothly.

Further, the rigidity of the straight tube portion is higher than the bellows tube portion, and the straight tube portion is hard to be bent. However, because the straight tube portion is made of synthetic resin, the straight tube portion can be bent more or less. Therefore, it is expected that the rigidity of the straight tube portion would be further increased.

Further, according to the harness exterior protector described in PTL 2, it is necessary to connect a circular-sectional-shaped harness exterior protector to an oval-sectional-shaped (flat) harness exterior protector via a hard-synthetic-resin-made protector (fixing member). Therefore, there is a fear that an overall structure of the harness exterior protector may be complex, and the harness exterior protector may be at high cost.

In view of the above, an object of the present invention is to provide a harness exterior protector composed of a bellows tube portion and a straight tube portion, able to receive a flat (oval-sectional-shaped) electric wire without spatial waste and a rattle, able to be routed smoothly and effectively in a narrow routing path such as a vehicle body corresponding to a shape of the routing path, and further, able to increase the bending rigidity of the straight tube portion.

Solution to Problem

For achieving the above object, according to a first aspect of the present invention, there is provided a harness exterior protector including:
a synthetic-resin-made flat bellows tube portion; and
a synthetic-resin-made flat straight tube portion integrally continued to the flat bellows tube portion.

According to the above, a flat (oval-sectional-shaped) electric wire can be inserted into and received in the flat bellows tube portion and the flat straight tube portion without a spatial waste and a rattle. Further, the flat bellows tube portion has a good flexibility, and the flat straight tube portion has a higher bending rigidity than the flat bellows tube portion and a conventional circular (circular-sectional-shaped) straight tube portion. The flat straight tube portion and/or the flat bellows tube portion can be routed smoothly in a narrow space of a vehicle or the like without interfering or the like. The word "flat" means "rectangular-sectional-shaped" or "oval-sectional-shaped" in this specification.

According to a second aspect of the present invention, there is provided a harness exterior protector including:
a synthetic-resin-made round bellows tube portion; and
a synthetic-resin-made flat straight tube portion integrally continued to the round bellows tube portion.

According to the above, the flat (oval-sectional-shaped) electric wire is inserted into and received in the flat straight tube portion without a spatial waste and a rattle, and a rattle of the flat electric wire in the round bellows tube portion is prevented. In the round bellows tube portion, the electric wire may be formed in a round shape instead of a flat shape. The round bellows tube portion has a good flexibility, and the flat straight tube portion has a higher bending rigidity than the round (circular-sectional-shaped) bellows tube portion and a conventional round straight tube portion. The flat straight tube portion can be routed smoothly in a narrow space of a vehicle or the like without interfering or the like. The word "flat" means "rectangular-sectional-shaped" or "oval-sectional-shaped" in this specification.

According to a third aspect of the present invention, there is provided a harness exterior protector including:
a synthetic-resin-made flat bellows tube portion; and
a synthetic-resin-made round straight tube portion integrally continued to the flat bellows tube portion.

According to the above, the flat (oval-sectional-shaped) electric wire is inserted into and received in the flat bellows tube portion without a spatial waste and a rattle, and a rattle of the flat electric wire in the round straight tube portion is prevented. In the round straight tube portion, the electric wire may be formed in a round shape instead of a flat shape. The flat bellows tube portion has a good flexibility, and the round straight tube portion has a higher bending rigidity than the flat bellows tube portion. The flat bellows tube portion together with the round straight tube portion (in this case, preferably, the straight tube portion is formed in a small radius substantially the same as the bellows tube portion), or only the flat bellows tube portion can be routed smoothly in a narrow space of a vehicle or the like without interfering or the like. The word "round" means "circular-sectional-shaped". The word "flat" means "rectangular-sectional-shaped" or "oval-sectional-shaped" in this specification.

According to a fourth aspect of the present invention, there is provided the harness exterior protector as described in the first aspect,
wherein an inner peripheral surface of the bellows tube portion and an inner peripheral surface of the straight tube portion are continued straight to each other without difference in level.

According to the above, the electric wire can be smoothly inserted into an inner space of the harness exterior protector without a catch both from an open end of the bellows tube portion and from an open end of the straight tube portion. Thus, an insertion workability of the electric wire is improved.

Advantageous Effects of Invention

According to the invention described in the first aspect, the flat (oval-sectional-shaped) electric wire can be received in the flat bellows tube portion and the flat straight tube portion without a spatial waste and a rattle. Further, while the flexibility of the flat bellows tube portion is maintained substantially the same as the round bellows tube portion, the flat bellows tube portion together with the flat straight tube portion, or only the bellows tube portion, or only the straight tube portion can be routed effectively, smoothly and surely in a narrow space of a vehicle or the like. Further, because the rigidity of the flat straight tube portion is increased higher than the conventional round straight tube portion, when the flat harness exterior protector is routed in a target member such as a vehicle body or a floor, a positioning accuracy of the routing can be increased by the flat straight tube portion while only the flat bellows tube portion is bent.

According to the invention described in the second aspect, the flat (oval-sectional-shaped) electric wire can be received in the flat straight tube portion without a spatial waste and a rattle. Thereby, a rattle of the flat electric wire in the round bellows tube portion is prevented. Further, the flexibility of the round bellows tube portion is increased, and the flat straight tube portion can be routed effectively, smoothly and surely in a narrow space of a vehicle or the like. Further, because the rigidity of the flat straight tube portion is increased higher than the conventional round straight tube portion, when the harness exterior protector is routed in a target member such as a vehicle body or a floor, a positioning accuracy of the routing can be increased by the flat straight tube portion while only the round bellows tube portion is bent.

According to the invention described in the third aspect, the flat (oval-sectional-shaped) electric wire can be received in the flat bellows tube portion without a spatial waste and a rattle. Thereby, a rattle of the flat electric wire in the round straight tube portion is prevented. Further, the flexibility of the flat bellows tube portion is maintained, and the flat bellows tube portion can be routed effectively, smoothly and surely in a narrow space of a vehicle or the like. Further, when the harness exterior protector is routed in a target member such as a vehicle body or a floor, a positioning accuracy of the routing can be increased by the round straight tube portion of which rigidity is higher than the flat bellows tube portion while only the flat bellows tube portion is bent.

According to the invention described in the fourth aspect, the electric wire can be smoothly inserted into an inner space of the harness exterior protector without a catch both from an open end of the bellows tube portion and from an open end of the straight tube portion. Thus, an insertion workability of the electric wire is improved.

DESCRIPTION OF EMBODIMENTS

Figure 1A:
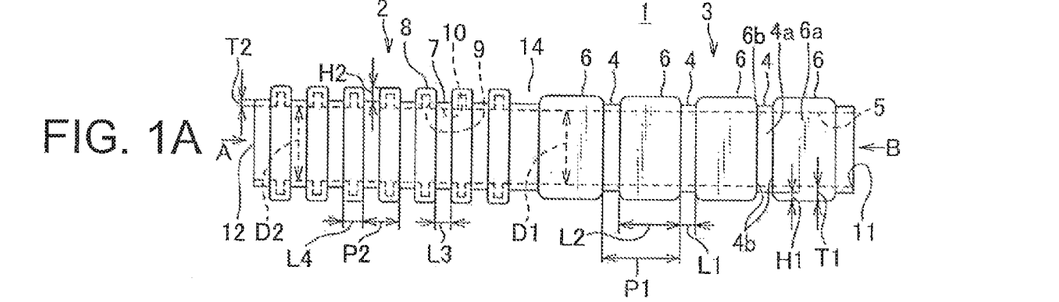
FIG. 1A is a side view showing one embodiment of a harness exterior protector according to the present invention in a free straight condition.
Figure 1B:
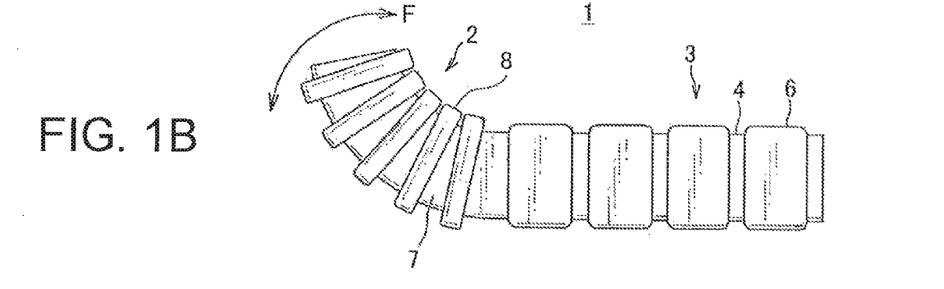
FIG. 1B is a side view showing the harness exterior protector of FIG. 1A in a bent condition.
Figure 1C:
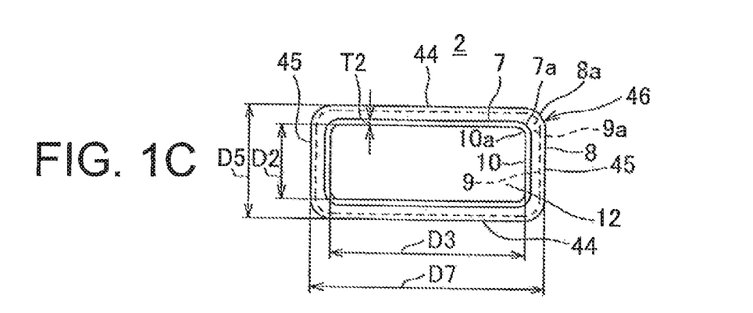
FIG. 1C is a front view seen from an arrow A of FIG. 1A showing the harness exterior protector.
Figure 1D:
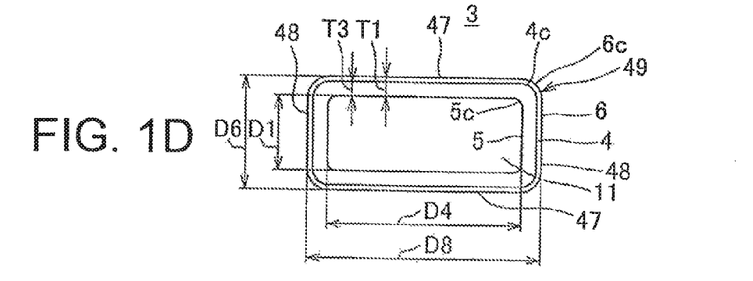
FIG. 1D is a front view seen from an arrow B of FIG. 1A showing the harness exterior protector.

FIGS. 1A to 1D show one embodiment of a harness exterior protector according to the present invention. FIG. 1A shows the harness exterior protector in a free condition. FIG. 1B shows the harness exterior protector of which a bellows tube portion is bent. FIG. 1C is a front view seen from an arrow A of FIG. 1A. FIG. 1D is a front view seen from an arrow B of FIG. 1A.

This harness exterior protector 1 is formed in a flat shape by a synthetic-resin-made flat (substantially rectangular sectional shaped) bellows tube portion 2 and a flat (substantially rectangular sectional shaped) straight tube portion 3. The flat straight tube portion 3 of this embodiment includes a plurality of shallow and narrow substantially rectangular groove portions (concave portions) 4 parallel to each other on an outer periphery of the flat straight tube portion 3. A substantially rectangular-sectional-shaped inner peripheral surface 5 of the flat straight tube portion 3 is formed flat or substantially flat without having groove portions 4 like the outer periphery. The groove portions 4 can be omitted. In this case, an outer peripheral surface 6a of the flat straight tube portion 3 is formed flat as same as the inner peripheral surface 5.

As shown in FIG. 1A, the groove portions 4 are arranged in a regular pitch in a longitudinal direction of the flat straight tube portion 3. A wide convex portion 6 is formed in a rectangular shape in between the rectangular groove portions 4 adjacent to each other. A width L1 of the groove portion 4 in the longitudinal direction is formed about half or less than half of a width L2 of the convex portion 6 in the longitudinal direction. The width L1 of the groove portion 4 is narrower than the width L2 of the convex portion 6. A depth H1 of the groove portion 4 is about 5 to 20% of a thickness T of the convex portion 6. The depth H1 of the groove portion 4 is formed very shallowly in comparison with a depth H2 of a concave portion 7 (e.g., a groove portion or a valley portion) of the flat bellows tube portion 2. For example, the depth H1 is formed about half or less than half of the depth H2 of the concave portion 7 of the flat bellows tube portion 2 (this is just an example because the depth H2 of the concave portion 7 of the flat bellows tube portion 2 can be set voluntarily).

The substantially rectangular groove portion 4 of the flat straight tube portion 3 is surrounded by a bottom surface 4a and front and rear end surfaces 4b in the longitudinal direction of the flat straight tube portion 3 each having a very small size (depth). In this embodiment, a crossing portion between the end surface 4b of the groove portion 4 and the outer peripheral surface 6a of the convex portion 6 is continued by an arc-shaped surface 6b. However, they can cross to each other at a right angle. The substantially rectangular sectional shaped bellows tube portion 2 and the substantially rectangular sectional shaped straight tube portion 3 respectively include arc-shaped surfaces 7a to 10a and arc-shaped surfaces 4c to 6c. If these arc-shaped surfaces are omitted, the flat bellows tube portion 2 and the flat straight tube portion 3 are in a complete rectangular shape.

The groove portion 4 is not provided on the inner peripheral surface 5 of the flat straight tube portion 3. However, in reality, upon a later-described resin forming, the inner peripheral surface 5 may be in a little wave shape (substantially flat shape) rather than a flat shape under an influence of the groove portion 4 and the convex portion 6. Even so, there is no problem in a practical use. The abrasion resistance and the rigidity of the substantially flat straight tube portion 3 are the same as the flat straight tube portion 3 having a completely flat inner peripheral surface 5. A type of the synthetic resin material for forming the flat harness exterior protector 1 can be selected properly as necessary from among the soft and hard resin materials.

In this embodiment, a width L1 (a length in the longitudinal direction) of the substantially rectangular groove portion 4 of the flat straight tube portion 3 is substantially the same as a width L3 (a length in the longitudinal direction) of the substantially rectangular groove portion 7 of the flat bellows tube portion 2. Further, a pitch P1 of the groove portion 4 of the flat straight tube portion 3 is substantially twice as long as a pitch P2 of the groove portion 7 of the flat bellows tube portion 2. These can be properly set.

While the substantially rectangular inner peripheral surface 5 of the flat straight tube portion 3 is formed flat or substantially flat, an inner periphery of the flat bellows tube portion 2 has concaves and convexes. A substantially rectangular inverted concave portion 9 on an inner periphery of the flat bellows tube portion 2 is interposed between substantially rectangular convex portions 8 on an outer periphery of the flat bellows tube portion 2. A substantially rectangular inverted convex portion 10 on the inner periphery of the flat bellows tube portion 2 is interposed between substantially rectangular concave portions 7 on the outer periphery of the flat bellows tube portion 2.

In this embodiment, a width L4 (a length in the longitudinal direction) of the convex portion 8 on the outer periphery of the flat bellows tube portion 2 is substantially the same as a width L3 (a length in the longitudinal direction) of the concave portion 7 of the flat bellows tube portion 2. A thickness T1 of the convex portion 6 of the flat straight tube portion 3 is formed thicker than a thickness T2 of the flat bellows tube portion 2 to increase the bending rigidity of the flat straight tube portion 3. A section modulus Z of the flat straight tube portion 3 is larger than the conventional round straight tube, thereby the bending rigidity of the flat straight tube portion 3 is higher than the conventional round straight tube.

The substantially rectangular inner peripheral surface 5 of the flat straight tube portion 3 is continued straight to a substantially rectangular inner peripheral surface 10 of the flat bellows tube portion 2, namely, the inverted convex portion 10 without difference in level. Namely, an inner diameter (shorter diameter) D1 of the flat straight tube portion 3 is formed the same as an inner diameter (shorter diameter) D2 of the flat bellows tube portion 2. An inner diameter (longer diameter) D3 of the flat straight tube portion 3 is formed the same as an inner diameter (longer diameter) D4 of the flat bellows tube portion 2.

Figure 2A:
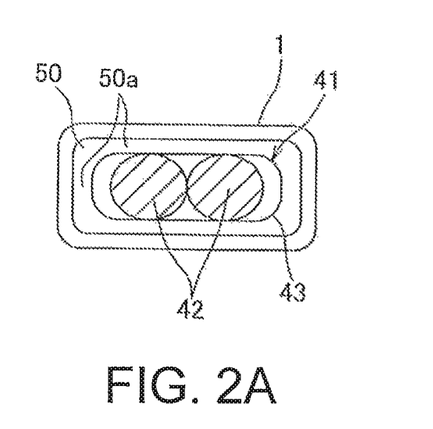
FIG. 2A is a front view showing a condition that a flat electric wire is received in the harness exterior protector.
Figure 2B:
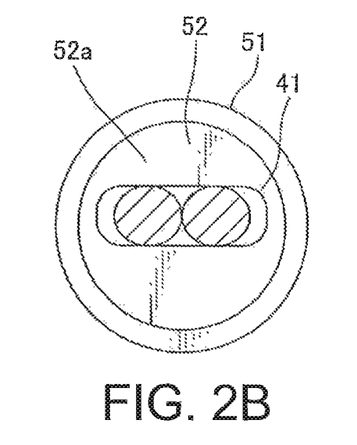
FIG. 2B is a front view showing a comparative example of the harness exterior protector.

This is, when an electric wire 41 (see FIG. 2) is inserted into (penetrates) an inside of the flat harness exterior protector 1, for allowing the electric wire 41 to be smoothly inserted without a catch both from an open end 11 of the flat straight tube portion 3 and from an open end 12 of the flat bellows tube portion 2.

For example, when the inner diameter (shorter diameter and longer diameter) of the flat straight tube portion 3 is larger than an example shown in FIG. 1A (an outer diameter of the flat straight tube portion 3 is also larger), a step (not shown) is formed at or around a boundary portion 14 between the flat bellows tube portion 2 and the flat straight tube portion 3. However, even in this case, when the electric wire 41 is inserted from the open end 12 of the flat bellows tube portion 2, interference between the step and a tip of the electric wire 41 is prevented.

By limiting an insertion direction of the electric wire 41, the outer diameter (shorter diameter D6 and/or longer diameter D8) of the flat straight tube portion 3 can be set larger than the outer diameter (shorter diameter D2 and/or longer diameter D5) of the flat bellows tube portion 2. In the embodiment shown in FIGS. 1A to 1D, the outer diameter (shorter diameter D6 and/or longer diameter D8) of the flat straight tube portion 3 is formed smaller than the outer diameter (shorter diameter D2 and/or longer diameter D5) of the flat bellows tube portion 2.

As shown in FIG. 1B, when a bending force F is applied to the flat harness exterior protector 1, only the flat bellows tube portion 2 is bent in a direction that the bending force F is applied (vertical direction in FIG. 1B), and the flat bellows tube portion 2 is kept straight without being bent. The flat bellows tube portion 2 is easy to be bent in a direction of the shorter diameter D5, and hard to be bent in a direction of the longer diameter D7.

For example, in a case that the thickness T2 of the flat bellows tube portion 2 is formed thick (for example, around 2 millimeter), when the bending force F is removed, the flat bellows tube portion 2 is elastically restored. Therefore (including a case that the thickness T2 is less than 2 millimeter, for example, around 1 millimeter), existing locking clamps (not shown) are attached to the front and rear flat bellows tube portions 2 adjacent to the flat bellows tube portion 2 at front and rear two positions in the longitudinal direction of the flat bellows tube portion 2, and while the flat bellows tube portion 2 is bent, the locking clamps of the flat straight tube portions 3 are locked and fixed to a not-shown mating member such as a vehicle body or a floor. Thereby, the flat bellows tube portion 2 is prevented from being restored.

In this case, in FIG. 1A, another flat straight tube portion 3 similar to a right side flat bellows tube portion 2 is integrally provided on a left end (a position denoted by reference sign 12) of the flat bellows tube portion 2. By using the substantially rectangular groove portions 4 of the front and rear flat straight tube portion 3, for example, a band portion (convex portion) of the not-shown locking clamp is wound around the groove portion 4, or the convex portion provided on the locking clamp is engaged (locked) with the groove portion 4. Thereby, the locking clamp can be attached to the flat straight tube portion 3 with good positional accuracy without displacement in the longitudinal direction.

The locking clamp is an existing one, for example, made by providing a support vertically at a base end of a band portion, providing a pair of claw portions at a tip of the support, providing a hole for inserting from a tip at the base end of the band portion, and providing a claw for locking a saw-tooth projection on a rear surface of the band portion in the hole. When a width of the band portion is wider than the width L1 of the groove portion 4, a rib-shaped convex portion formed on the center in the longitudinal direction of the band portion, or a convex portion provided at the base end of the band portion is engaged with the groove portion 4. Thereby, the band portion is positioned, and prevented from being moved unexpectedly in the longitudinal direction. Incidentally, when the flat straight tube portion 3 having no groove portion 4 is used, a band portion of the locking clamp is banded and fixed to an end of the flat straight tube portion 3 near the boundary portion 14 between the flat bellows tube portion 2 and the flat straight tube portion 3.

As shown in FIG. 1C, the flat bellows tube portion 2 is formed in a substantially rectangular tubular shape by upper and lower parallel longer sides 44 and left and right parallel shorter sides 45. A crossing portion 46 between the longer side 44 and the shorter side 45 is continued to them smoothly in an arc shape. The crossing portion 46 is composed of an arc surface 8a of an outside convex portion 8, an arc surface 7a of an inside concave portion 7, an arc surface 9a of an outside concave 9, and an arc surface 10a of an inner peripheral surface 10 of the flat bellows tube portion 2. A gap between outer surfaces of the outside convexes 8 on the upper and lower longer sides 44 is the shorter diameter D5, and a gap around the inner peripheral wall 10 on the upper and lower longer sides 44 is the shorter diameter D2.

A gap between outer surfaces of the outside convexes 8 on the left and right shorter sides 45 is the longer diameter D7, and a gap around the inner peripheral wall 10 on the left and right shorter sides 45 is the longer diameter D3. A thickness of the outside convex portion 8 and a thickness T2 (FIG. 1A) of the inside concave portion 7 at the crossing portion 46, the longer sides 44, and the shorter sides 45 are formed substantially the same, and thin.

As shown in FIG. 1D, the flat straight tube portion 3 is formed in a substantially rectangular tubular shape by upper and lower parallel longer sides 47 and left and right parallel shorter sides 48. A crossing portion 49 between the longer side 47 and the shorter side 48 is continued to them smoothly in an arc shape. The crossing portion 49 is composed of an arc surface 6c of an outside convex portion 6, an arc surface 4c of the substantially rectangular groove portion 4, and an arc surface 5c of the substantially rectangular inner peripheral surface 5. A gap between outer surfaces of the outside convexes 6 on the upper and lower longer sides 47 is the shorter diameter D6, and a gap around the inner peripheral wall 5 on the upper and lower longer sides 47 is the shorter diameter D1.

A gap between outer surfaces of the outside convexes 6 on the left and right shorter sides 48 is the longer diameter D8, and a gap around the inner peripheral wall 5 on the left and right shorter sides 48 is the longer diameter D4. A thickness T1 of the substantially rectangular outside convex portion 6 is thick, a thickness T3 of the substantially rectangular groove portion 4 is a little thinner than the thickness T1 of the convex portion 6. The thickness T3 of the groove portion 4 is thicker than a thickness T2 of the flat bellows tube portion 2.

In the embodiment shown in FIG. 1, a slit in the longitudinal direction for inserting the electric wire is not provided on the flat harness exterior protector 1. However, the slit (not shown) in the longitudinal direction for inserting the electric wire may be provided on the flat harness exterior protector 1. When the slit is provided, it is unnecessary to insert the electric wire 41 (FIGS. 2A and 2B) from end openings 11, 12 of the harness exterior protector 1. The electric wire 41 may be inserted into the slit in a radial direction of the slit by expanding the slit.

FIG. 2A shows a condition that the flat (substantially oval sectional shaped) electric wire 41 is inserted into an inner space 50 of the flat (substantially rectangular tubular shaped) harness exterior protector 1. As a comparison example of FIG. 2A, FIG. 2B shows a condition that the same flat electric wire 41 is inserted into an inner space 52 of a round (circular sectional shaped) harness exterior protector 51. In comparison with the round harness exterior protector 51 of FIG. 2B, a gap 50a between an inner peripheral wall of the harness exterior protector 1 and an outer peripheral wall of the electric wire 41 is small, and spatial waste is not generated in the flat harness exterior protector 1 of FIG. 2A. Because the gap 50a is small, the rattle of the electric wire 41 in an inside of the flat harness exterior protector 1 is also prevented.

The electric wire 41 in the embodiment shown in FIGS. 2A and 2B is made by covering a plurality of (two) left and right parallel insulation-coating electric wires 42 with a synthetic-resin-made thin tube, a vinyl tape, a conductive-metal-made braided shield 42 or a shield coating. The electric wires 41 are not limited to these as long as the electric wires having a plurality of conductors are arranged left and right parallel to each other and, for example, tied in a bundle.

The flat harness exterior protector 1 of FIG. 2A is formed thinner in the vertical direction than the round harness exterior protector 51 of FIG. 2B. Therefore, the flat harness exterior protector 1 can be routed smoothly and effectively in a narrow space (routing path) such as a vehicle body without interfering with the vehicle body. It is of course possible to rotate the flat harness exterior protector 1 90 degrees, convert the vertical direction into the horizontal direction, and arrange the flat harness exterior protector 1 in the narrow routing path such as a vehicle body.

Figure 3:
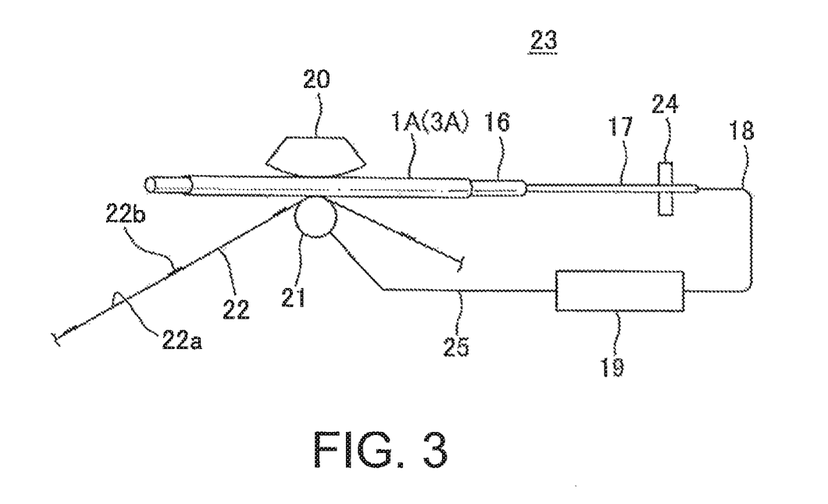
FIG. 3 is an explanatory view showing an abrasion resistance testing method of the harness exterior protector.

As a reference, FIG. 3 shows an abrasion resistance testing method of a circular-sectional-shaped straight tube portion 3A having a groove portion (4) of the circular-sectional-shaped harness exterior protector 1A for estimating abrasion resistance of the flat straight tube portion 3 having the groove portion 4 of the flat harness exterior protector 1 in FIG. 1.

This testing method includes the steps of: inserting a conductive-metal-made aluminum pipe 16 into an inside of the straight tube portion 3A (sample) of the harness exterior protector 1A without a gap; connecting a continuity tester 19 with an electric wire 17 inserted into the aluminum pipe 16 via a lead wire 18; putting a weight 20 on an upper surface of the straight tube portion 3A; making a band-shaped abrasion tape 22 abut on a lower surface of the straight tube portion 3A via a rotatable conductive-metal-made roller 21; and connecting the roller 21 with the continuity tester 19 by the electric wire 25. The abrasion tape 22 is made by arranging conductive metal portions 22b in a regular interval on a surface of a file-shaped portion 22a. This testing is done by an abrasion resistance tester 23 having the above components. In FIG. 3, reference sign 24 denotes a supporting tool for receiving the electric wire 17. The aluminum pipe 16 and the electric wire 17 may be a component product of a wiring harness. In an embodiment shown in FIGS. 2A and 2B, the wiring harness is, for example, composed of the electric wire 41 and the harness exterior protector 1.

Then, the roller 21 is arranged opposite to the circular groove (4) on an outer periphery of the straight tube portion 3A. The abrasion tape 22 is rotated in a loop shape by a not-shown drive portion. An outer peripheral surface of the straight tube portion 3A is worn by rubbing with the file-shaped portion 22a of the abrasion tape 22. When the straight tube portion 3A is worn into a hole, the conductive portion 22b of the abrasion tape 22 abuts on the aluminum pipe 16 disposed inside of the straight tube portion 3A. Then, a closed circuit is formed by the aluminum pipe 16, the electric wire 17, the lead wire 18, the continuity tester 19, the roller 21, and the conductive portion 22b of the abrasion tape 22. The continuity tester 19 measures and displays a moving distance of the abrasion tape 22. The circular groove portion (4) is different from the groove portion 4 in the embodiment of FIG. 1 in the way that the groove portion (4) is not in a rectangular shape. In the above abrasion resistance test, a depth H1 of the groove portion (4) of the straight tube portion 3A as a sample is 5 to 20% of a thickness T1 of the straight tube portion 3A.

As a result of the abrasion resistance test using a sample of the straight tube portion 3A having the thickness T1 of 1 millimeter, the abrasion resistance (moving distance of the abrasion tape 22) of the complete straight tube portion having no groove portion (4) on the outer periphery of the straight tube portion 3A is 4050 millimeter, and the abrasion resistance (moving distance of the abrasion tape 22) of the straight tube portion 3A having the groove portion (4) is 4800 millimeter. The abrasion resistance of the straight tube portion 3A having the groove portion (4) is higher than the straight tube portion having no groove portion (4) (outer diameters of the straight tube portions are the same).

The reason is because the moving distance of the abrasion tape 22 moving along the straight tube portion 3A having a large surface area is increased. Because the surface area of the straight tube portion 3A having the groove portion (4) is increased by a radial height H1 of the front and rear end surfaces 4b (FIG. 1) of the groove portion (4) in comparison with the straight tube portion having no groove portion (the surface area is a sum of an area of the front and rear end surface 4b of the groove portion (4) and an area of the bottom surface 4a of the groove portion (4)).

In this way, the abrasion resistance of the flat straight tube portion 3 in FIG. 1 is estimated high enough by having the groove portion 4 in a case that the flat straight tube portion 3 abuts on a relatively soft portion of a mating member such as a vehicle body or a floor. Further, even in a case that the flat straight tube portion 3 abuts on a hard portion of the mating member such as a vehicle body or a floor, by shaving the front and rear end surfaces 4b of the groove portion 4, the abrasion resistance is estimated high.

Further, it is also estimated that because an area of the outer peripheral surface 6a of the flat straight tube portion 3 is reduced due to the groove portion 4 (an area of the outer peripheral surface 6a of the convex portion 6 is smaller than that having no groove portion 4), when the convex portion 6 abuts on the mating member such as a vehicle body or a floor with a small area, sliding abrasion resistance between the outer peripheral surface 6a of the convex portion 6 and the mating member such as a vehicle body or a floor is reduced, thereby the abrasion resistance of the flat straight tube portion 3 is increased.

Other than the above abrasion resistance test, a bending stress test of the circular sectional shaped straight tube portion 3A has been done. The bending stress test (not shown) includes the steps of: supporting the straight tube portion 3A at front and rear two positions in the longitudinal direction with supporting tools; pressing downward the straight tube portion 3A in the center between the two positions with a metal jig having a not-shown projection projected downward with an open angle 30 degrees; and measuring the maximum load generated upon bending.

As a result of the bending stress test, it become clear that the bending load of the straight tube portion 3A having the groove portion (4) is equal to or more than that of the straight tube portion having no groove portion (4). The reason is because due to the front and rear end surfaces 4b at left and right end portions (end portions perpendicular to the bending direction) of the very shallow groove portion (4) provided on the straight tube portion 3A, the rigidity in the bending direction of the straight tube portion 3A is increased.

If concave and convex 7 to 10 are respectively provided on the inner periphery and outer periphery such as the flat bellows tube portion (2), the bending rigidity is decreased due to the concave and convex 7 to 10 provided on the inner and outer peripheries. However, the groove portion (4) of the straight tube portion 3A is very shallow, and the groove portion (4) is only provided on the outer periphery, but not provided on the inner periphery, thereby the bending rigidity is increased (at least equal to the bending rigidity of the straight tube portion having no groove portion 4).

It is assumed that this result is applied to the flat straight tube portion 3 of FIG. 1. The depth H1 of the groove portion (4) of the straight tube portion 3A as the sample of the above bending stress test is formed in a range of 5 to 20% of the thickness T1 of the straight tube portion 3A. Incidentally, the applicant of the present invention has already proposed a circular-sectional-shaped harness exterior protector 1A having the straight tube portion 3A in JP, A, 2012-38866.

Figure 4A:
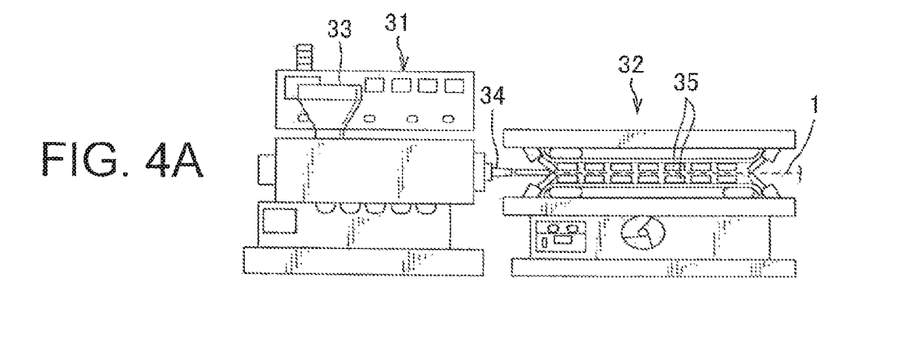
FIG. 4A is an overall side view showing a method for producing the harness exterior protector.
Figure 4B:
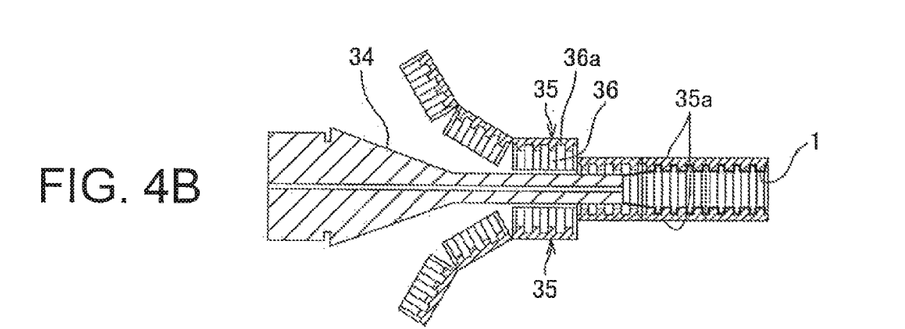
FIG. 4B is a partial sectional view showing the method for producing the harness exterior protector.

FIGS. 4A and 4B show one embodiment of a method for producing the above flat harness exterior protector 1. There are two types of the method for producing the flat harness exterior protector 1: an air blow molding and a vacuum molding. Both molding methods will be explained using commonly FIGS. 4A and 4B.

The air blow molding uses a resin extruding machine 31 and a blow molding machine 32 of FIG. 4A. The extruding machine 31 includes: a hopper 33 into which resin material is supplied; and a nozzle from which a melted resin is pushed out at a constant rate. The blow molding machine 32 includes a plurality of molding dies 35 rotated reversely in an upper side and a lower side of FIG. 4B. Each molding die 35 is composed of a sub molding die 35a for forming the flat bellows tube portion 2 and a sub molding die (not shown) for forming the flat straight tube portion 3.

The sub molding die 35a for forming the flat bellows tube portion 2 includes deep groove portions 36a parallel to each other in a moving direction on an inner peripheral wall of rectangular groove portions 36 in a molding die feeding direction. A bottom wall of the concave portion 7 of the flat bellows tube portion 2 is formed with an inner surface of the groove portion 36. The convex portion 8 is formed with an inner surface of the groove portion 36a. The sub molding die (not shown) for forming the flat straight tube portion 3 includes: a rectangular groove portion for forming the convex portion 6 of the flat straight tube portion 3 in the molding die feeding direction; and a low projection for forming the shallow groove portion 4 of the flat straight tube portion 3 arranged parallel to each other in the molding die moving direction. When the shallow groove portion 4 of the flat straight tube portion 3 is not formed, and an outer peripheral wall of the flat straight tube portion 3 is formed in a flat shape in the longitudinal direction, the sub molding die (not shown) for forming the flat straight tube portion 3 only includes the rectangular groove portion in the molding die feeding direction.

While a tip end of the flat harness exterior protector 1 is closed with a not-shown cover, when the melted resin material and compressed air are shot into an inside of the molding die 35 from a nozzle 34, the harness exterior protector 1 is resin-molded along an inner peripheral surface of each molding die 35. In the molding machine 32, the upper and lower molding dies 35 are rotated in the molding die feeding direction to extrude the harness exterior protector 1 continuously, and the long flat harness exterior protector 1 is reeled up in a drum (not shown). When a slit is provided in the longitudinal direction of the flat harness exterior protector 1, a drawing machine (not shown) provides the slit, and the flat harness exterior protector 1 is reeled up in a reeling machine (not shown). The flat harness exterior protector 1 is cut in a required length to be used.

In the vacuum forming, while the tip end of the flat harness exterior protector 1 is open (a cover is not used), a space in the molding die 35 is vacuumed from a hole (not shown) provided on the molding die 35, and the melted resin material supplied from the nozzle 34 is provided along an inner peripheral surface of the molding die 35 to form the harness exterior protector 1. The flat harness exterior protector 1 is extruded continuously by a rotation of upper and lower molding dies 35. If a slit is necessary, the drawing machine (not shown) provides the slit, and the reeling machine continuously reels up the flat harness exterior protector 1. The shapes of the sub molding die 35a for the flat bellows tube portion 2 and the sub molding die (not shown) for flat bellows tube portion 2 are the same as those of the blow molding machine.

Figure 5:
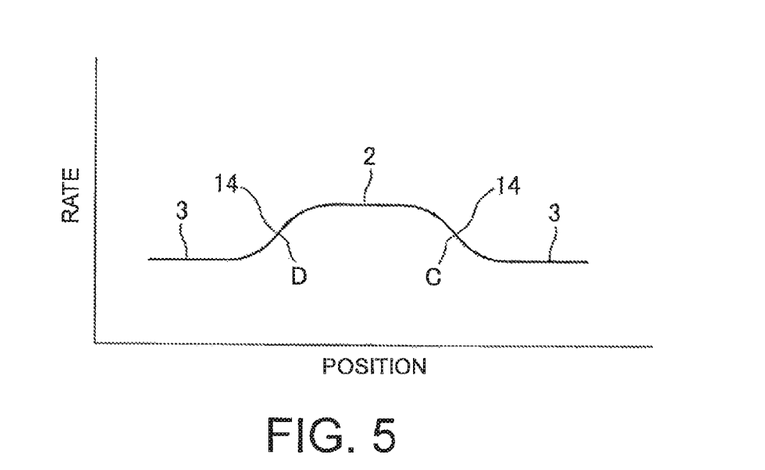
FIG. 5 is a diagrammatic view for explaining a main part of the method for producing the harness exterior protector.

In both molding methods, a supplying rate of the melted resin material from the nozzle 34 of the resin extruding machine 31 is constant. As shown in FIG. 5, when a feed rate of the molding die 35 for the flat bellows tube portion 2 is fast, a thin flat bellows tube portion 2 is formed. When the feed rate of the molding die 35 for the flat straight tube portion 3 is slow, a thick flat straight tube portion 3 is formed. In FIG. 5, a vertical axis denotes a feed rate of the molding die 35, and a horizontal axis denotes a position of the flat harness exterior protector 1, namely, the flat bellows tube portion 2 and the flat straight tube portion 3.

For increasing the rigidity of the boundary portion 14 between the flat bellows tube portion 2 and the flat straight tube portion 3, as shown in FIG. 5, the feed rate of the molding die 35 is gradually fast, or gradually slow for ensuring the thick boundary portion 14 between the flat bellows tube portion 2 and the flat straight tube portion 3. The feed rate of the molding die 35 is gradually fast (denoted by reference sign "C") in the boundary portion 14 from the front flat straight tube portion 3 to the flat bellows tube portion 2. The feed rate of the molding die 35 is gradually slow (denoted by reference sign "D") in the boundary portion 14 from the flat bellows tube portion 2 to the rear flat straight tube portion 3.

FIGS. 6A to 6C and FIGS. 7A to 7C show the other embodiments of the harness exterior protector according to the present invention. While the harness exterior protector 1 of FIG. 1 includes: the flat bellows tube portion 2; and the flat straight tube portion 3, in the harness exterior protectors 1', 1" of FIGS. 6A to 6C and FIGS. 7A to 7C, any one of the bellows tube portion 2 and the straight tube portion 3 is flat, and the other is round (circular sectional shape).

Figure 6A:
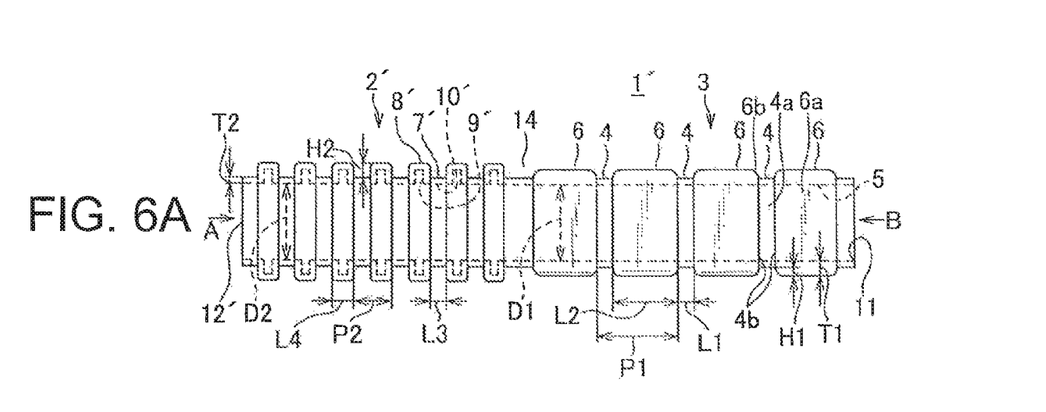
FIG. 6A is a side view showing another embodiment of the harness exterior protector.
Figure 6B:
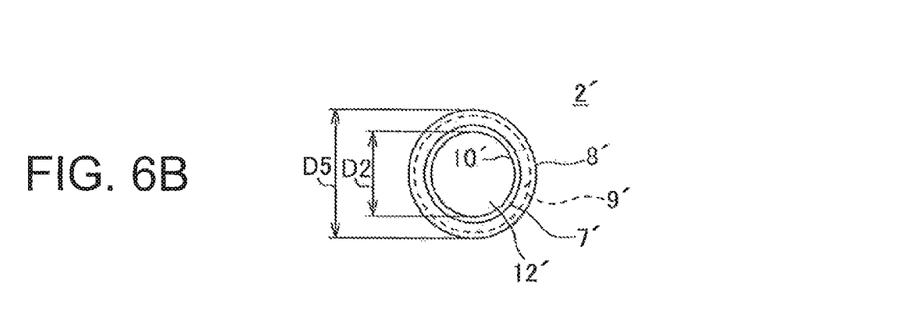
FIG. 6B is a front view seen from an arrow A of FIG. 6A.
Figure 6C:
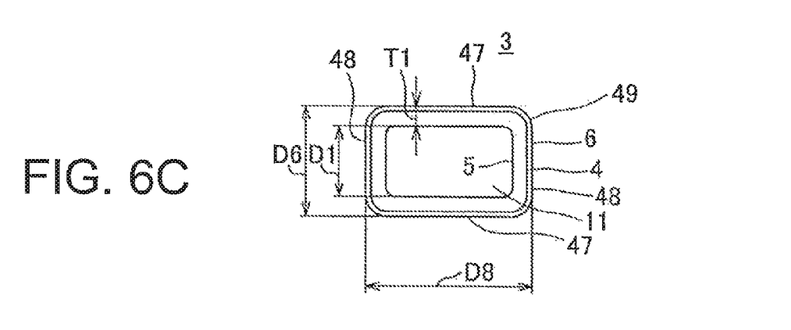
FIG. 6C is a front view seen from an arrow B of FIG. 6A.

The harness exterior protector 1' of FIG. 6A is made of synthetic resin, and integrally formed with a circular-sectional-shaped bellows tube portion 2' (FIG. 6B) and the flat (substantially rectangular sectional shaped) straight tube portion 3 (FIG. 6C). By using the circular-sectional-shaped bellows tube portion 2', the bending ability of the bellows tube portion 2' is higher than the flat bellows tube portion 2 of FIG. 1. Further, by using the flat straight tube portion 3, the straight tube portion 3 can be routed smoothly, effectively, and surely in a narrow space (routing path) such as a vehicle body. Additionally, the flat electric wire 41 (FIG. 2) can be received compactly in a space-saving manner in an inside of the flat straight tube portion 3. Further, the bending rigidity of the flat straight tube portion 3 can be higher than the conventional round straight tube.

The horizontal width D8 of the flat straight tube portion 3 in FIG. 6C is narrower than the flat straight tube portion 3 of FIG. 1C. By narrowing the width D8, the width D8 is closer to an outer diameter D5 of the circular-sectional-shaped bellows tube portion 2'. Thereby, a step of the boundary portion 14 between the flat straight tube portion 3 and the circular-sectional-shaped bellows tube portion 2' is reduced. Preferably, an inner diameter D2 (even in a range of 360 degrees) of the circular-sectional-shaped bellows tube portion 2' and an inner diameter D1 of the shorter side of the flat straight tube portion 3 are the same for improving the insertion workability of the electric wire.

Reference signs of components of the flat straight tube portion 3 in FIG. 1A are also used to reference signs of components of the flat straight tube portion 3 in FIG. 6A, reference signs of components of the flat bellows tube portion 2 in FIG. 1A are dashed to use in reference signs of components of circular-sectional-shaped bellows tube portion 2' in FIG. 6A, and a detailed explanation is omitted.

In the circular-sectional-shaped bellows tube portion 2' of FIG. 6B, reference sign 7' denotes a concave portion (valley portion) of the bellows. Reference sign 8' denotes a convex portion of the bellows. Reference sign 9' denotes an outward concave portion (inner surface of the convex portion 8'). Reference sign 10' denotes a circular inner peripheral surface. Reference sign 12' denotes a circular open end.

In the flat straight tube portion 3 of FIG. 6C, reference sign 4 denotes a narrow and shallow groove portion. Reference sign 5 denotes a rectangular inner peripheral surface. Reference sign 6 denotes a convex portion having a large diameter between front and rear groove portions 4. Reference sign 11 denotes a rectangular open end. Reference sign 47 denotes a longer side. Reference sign 48 denotes a shorter side. Reference sign 49 denotes a crossing portion on four corners. It is possible to omit the shallow groove portion 4 of the flat straight tube portion 3.

As a method for producing the harness exterior protector 1' of FIGS. 6A to 6C, a molding die 35 for resin-molding the circular-sectional-shaped bellows tube portion 2' and a molding die (not shown) for resin-molding the flat straight tube portion 3 are used in the air blow type or the vacuum type extruding machine 32 in FIGS. 4A and 4B. The molding die 35 for forming the bellows tube portion includes: a semi-circular-sectional-shaped groove portion (36) (for forming the concave portion 7' of the bellows tube portion 2') in a molding die feeding direction; and a plurality of deep concave grooves (for forming the convex portion 8' of the bellows tube portion 2') provided parallel to each other on an inner peripheral surface of the semi-circular-sectional-shaped groove portion (36). The molding die (not shown) for forming the straight tube portion includes: a rectangular-sectional-shaped groove portion (for forming the convex portion 6 of the straight tube portion 3) in the molding die feeding direction similar to the embodiment of FIG. 1A; and a plurality of low projections (for forming the shallow groove portion 4 of the straight tube portion 3) provided parallel to each other on the inner peripheral surface of the rectangular-sectional-shaped groove portion. When the groove portion 4 is omitted, a molding die (not shown) having only the rectangular-sectional-shaped groove portion in the molding die feeding direction for forming the straight tube portion is used.

In the extrusion machine 32, an extrusion rate of the melted resin material from the nozzle 34 (FIG. 4A) is constant. The feed rate of the molding die 35 for forming the circular-sectional-shaped bellows tube portion 2' is fast so as to form the thin circular-sectional-shaped bellows tube portion 2'. The feed rate of the molding die (not shown) for forming the flat straight tube portion 3 is slow so as to form the thick flat straight tube portion 3. Further, as explained in FIG. 5, preferably, the feed rate of the molding die in the boundary portion between the molding die 35 for forming the bellows tube portion 2' and the molding die (not shown) for forming the straight tube portion 3 is slow so as to form the thick boundary portion 14 between the circular-sectional-shaped bellows tube portion 2' and the flat straight tube portion 3. Thereby, the bending rigidity of the boundary portion 14 is increased.

The method for producing the harness exterior protector 1 other than using the extrusion machine 32 includes the steps of: using a single straight long injection molding die (not shown); and injection-molding the circular-sectional-shaped bellows tube portion 2' and the flat straight tube portion 3 simultaneously with the melted resin material. This injection molding die for forming the bellows tube portion includes: a semi-circular-sectional-shaped groove portion (for forming the concave portion 7' of the bellows tube portion 2') in an axial direction; and a plurality of deep concave grooves (for forming the convex 8' of the bellows tube portion 2') provided parallel to each other on an inner peripheral surface of the semi-circular-sectional-shaped groove portion. The molding die for forming the straight tube portion 3 includes: a rectangular-sectional-shaped groove portion (for forming the convex portion 6 of the straight tube portion 3) in an axial direction; and a plurality of low projections (for forming the shallow groove portion 4 of the straight tube portion 3) provided parallel to each other on an inner peripheral surface of the rectangular-sectional-shaped groove portion. When the groove portion 4 is omitted, a molding die having only the rectangular-sectional-shaped groove portion in the axial direction for forming the straight tube portion is used.

Figure 7A:
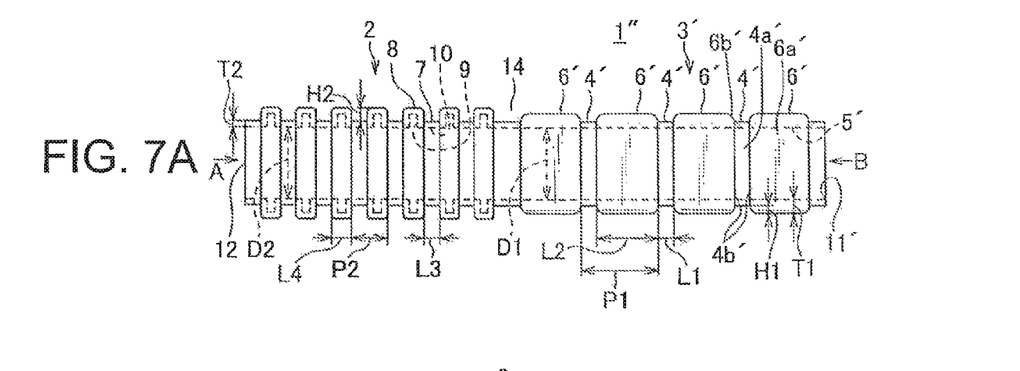
FIG. 7A is a side view showing the other embodiment of the harness exterior protector.
Figure 7B:
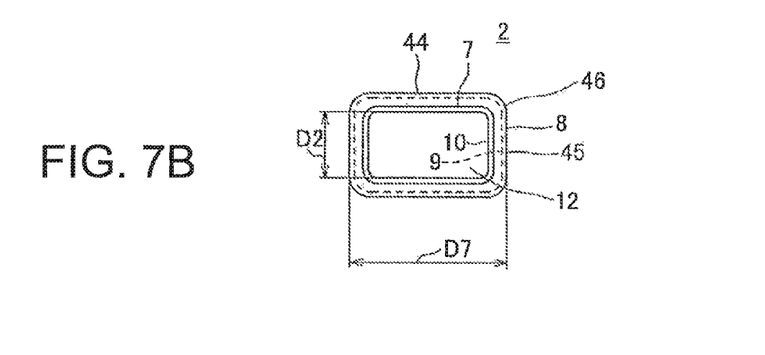
FIG. 7B is a front view seen from an arrow A of FIG. 7A.
Figure 7C:
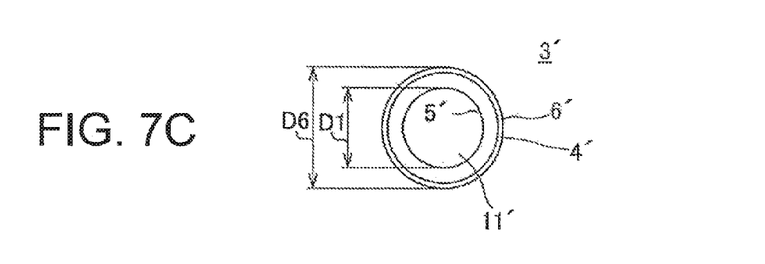
FIG. 7C is a front view seen from an arrow B of FIG. 7A.

The harness exterior protector 1' of FIG. 7A is made of synthetic resin, and integrally formed with the flat (substantially rectangular sectional shaped) bellows tube portion 2 (FIG. 7B) and a round (circular sectional shaped) straight tube portion 3' (FIG. 7C). By using the flat bellows tube portion 2', while the flexibility of the flat bellows tube portion 2' is maintained, the flat bellows tube portion 2' can be routed smoothly, effectively, and surely in a narrow space (routing path) such as a vehicle body. In addition, the flat electric wire 41 (FIGS. 2A and 2B) can be received compactly in a space-saving manner in an inside of the flat bellows tube portion 2'. Further, by using the circular-sectional-shaped straight tube portion 3, the bending rigidity of the round straight tube portion 3' is improved evenly in a range of 360 degrees in any direction of a circumferential direction. It is also possible that the shallow groove portion 4' of the round straight tube portion 3' is omitted, and an outer peripheral surface (6') of the round straight tube portion 3' is formed flat similar to the inner peripheral surface (5').

In the embodiment shown in FIG. 7B, the width D7 in the horizontal direction of the flat bellows tube portion 2 is narrower than that of the flat bellows tube portion 2 in FIG. 1C. By narrowing the width D7, the width D7 is closer to an outer diameter D6 of the circular-sectional-shaped straight tube portion 3' of FIG. 7C. Thereby, a step of the boundary portion 14 between the flat bellows tube portion 2 and the circular-sectional-shaped straight tube portion 3' is reduced. Preferably, an inner diameter D2 of the flat bellows tube portion 2 and an inner diameter D1 (even in a range of 360 degrees) of the circular-sectional-shaped straight tube portion 3' are the same for improving the insertion workability of the electric wire.

Reference signs of components of the flat bellows tube portion 2 in FIG. 1A are also used to reference signs of components of the flat bellows tube portion 2 in FIG. 7A, reference signs of components of the straight tube portion 3 in FIG. 1A are dashed to use in reference signs of components of the circular-sectional-shaped straight tube portion 3' in FIG. 7A, and a detailed explanation is omitted.

In the flat bellows tube portion 2 of FIG. 7B, reference sign 7 denotes a concave portion (valley portion) of the bellows. Reference sign 8 denotes a convex portion of the bellows. Reference sign 9 denotes an outward concave portion (inner surface of the convex portion 8). Reference sign 10 denotes a rectangular inner peripheral surface. Reference sign 12 denotes a rectangular open end.

In the round straight tube portion 3' of FIG. 7C, reference sign 4' denotes a narrow and shallow groove portion. Reference sign 5' denotes a circular inner peripheral surface. Reference sign 6' denotes a convex portion having a large diameter between front and rear groove portions 4'. Reference sign 11' denotes a circular open end.

As a method for producing the harness exterior protector 1" of FIGS. 7A to 7C, a molding die 35 for resin-molding the flat bellows tube portion 2 and a molding die (not shown) for resin-molding the circular-sectional-shaped straight tube portion 3' are used in the air blow type or the vacuum type extruding machine 32 in FIGS. 4A and 4B. The molding die 35 for forming the bellows tube portion includes: a rectangular-sectional-shaped groove portion (36) (for forming the concave portion 7 of the bellows tube portion 2) in a molding die feeding direction; and a plurality of deep concave grooves (for forming the convex portion 8 of the bellows tube portion 2) provided parallel to each other on an inner peripheral surface of the rectangular-sectional-shaped groove portion (36). The molding die (not shown) for forming the straight tube portion includes: a circular-sectional-shaped groove portion (for forming the convex portion 6' of the straight tube portion 3') in the molding die feeding direction; and a plurality of low projections (for forming the shallow groove portion 4' of the straight tube portion 3') provided parallel to each other on the inner peripheral surface of the circular-sectional-shaped groove portion. When the groove portion 4' is omitted, a molding die (not shown) having only the circular-sectional-shaped groove portion in the molding die feeding direction for forming the straight tube portion is used.

In the extrusion machine 32, an extrusion rate of the melted resin material from the nozzle 34 (FIG. 4A) is constant. The feed rate of the molding die 35 for forming the flat bellows tube portion 2 is fast so as to form the thin flat bellows tube portion 2. The feed rate of the molding die (not shown) for forming the circular-sectional-shaped straight tube portion 3' is slow so as to form the thick circular-sectional-shaped straight tube portion 3. Further, as explained in FIG. 5, preferably, the feed rate of the molding die in the boundary portion between the molding die 35 for forming the bellows portion 2' and the molding die (not shown) for forming the straight tube portion 3 is slow so as to form the thick boundary portion 14 between the flat bellows tube portion 2 and the circular-sectional-shaped straight tube portion 3'. Thereby, the bending rigidity of the boundary portion 14 is increased.

The method for producing the harness exterior protector 1 other than using the extrusion machine 32 includes the steps of: using a single straight long injection molding die (not shown); and injection-molding the flat bellows tube portion 2 and the circular-sectional-shaped straight tube portion 3' simultaneously with the melted resin material. This injection molding die for forming the bellows tube portion includes: a rectangular-sectional-shaped groove portion (for forming the concave portion 7 of the bellows tube portion 2) in an axial direction; and a plurality of deep concave grooves (for forming the convex 8 of the bellows tube portion 2) provided parallel to each other on an inner peripheral surface of the rectangular-sectional-shaped groove portion. The molding die for forming the straight tube portion includes: a semi-circular-sectional-shaped groove portion (for forming the convex portion 6' of the straight tube portion 3') in an axial direction; and a plurality of low projections (for forming the shallow groove portion 4' of the straight tube portion 3') provided parallel to each other on an inner peripheral surface of the semi-circular-sectional-shaped groove portion. When the groove portion 4' is omitted, a molding die having only the semi-circular-sectional-shaped groove portion in the axial direction for forming the straight tube portion is used.

Incidentally, in the above embodiments, the substantially rectangular-sectional-shaped bellows tube portion 2 and the substantially rectangular-sectional-shaped straight tube portion 3 are used as the flat bellows tube portion 2 and the flat straight tube portion 3. However, other than the substantially rectangular sectional shape, an oval-sectional-shaped bellows tube portion and an oval-sectional-shaped straight tube portion can be used as the flat bellows tube portion 2 and the flat straight tube portion 3. Further, when the shallow groove portion 4 on the outer periphery of the straight tube portion 3 is omitted, due to the flat shape of the straight tube portion 3, the rigidity of the straight tube portion 3 is higher than the conventional round straight tube portion.

Further, in the above embodiments, lengths, diameters, the numbers, and layouts of the bellows tube portion 2, 2' and the straight tube portion 3, 3' of the harness exterior protector 1, 1', 1" can be properly set. For example, when the single harness exterior protector 1', 1" with one or more of the bellows tube portion 2, 2' and one or more of the straight tube portion 3, 3' is arranged with a proper layout, only the bellows tube portion 2' at a position necessary to be bent largely is formed in a circular sectional shape, and only the straight tube portion 3 at a position necessary to be arranged in a narrow space of a vehicle or the like is formed in a flat shape.

INDUSTRIAL APPLICABILITY

A harness exterior protector composed of a bellows tube portion and a straight tube portion according to the present invention is able to receive an oval-sectional-shaped (flat) electric wire without spatial waste and a rattle, able to be routed smoothly and effectively in a narrow routing path such as a vehicle body corresponding to a shape of the routing path, and further, able to increase the bending rigidity of the straight tube portion.

REFERENCE SIGNS LIST 1, 1', 1" Harness exterior protector
2 flat bellows tube portion
2' round bellows tube portion
3 flat straight tube portion
3' round straight tube portion
5 inner peripheral surface
10 inner peripheral surface

The invention claimed is:
1. A harness exterior protector comprising:
a synthetic-resin-made bellows tube portion having concaves and convexes on both inner and outer peripheral surfaces thereof; and a synthetic-resin-made straight tube portion integrally continued to the bellows tube portion and having an outer peripheral surface with concaves and convexes and a straight inner peripheral surface without concaves and convexes, wherein the concaves and convexes of the outer peripheral surface of the straight tube portion and the straight inner peripheral surface of the straight tube portion are configured to provide the straight tube portion with greater rigidity than the bellows tube portion.
2. The harness exterior protector as claimed in claim 1, wherein the inner peripheral surface of the bellows tube portion and the straight inner peripheral surface of the straight tube portion are continued straight to each other without difference in level.

* * * * *